July 2, 1946.  D. W. MOORE, JR  2,402,973
TRANSMITTER FOR TELEMETERING SYSTEMS
Filed May 18, 1942
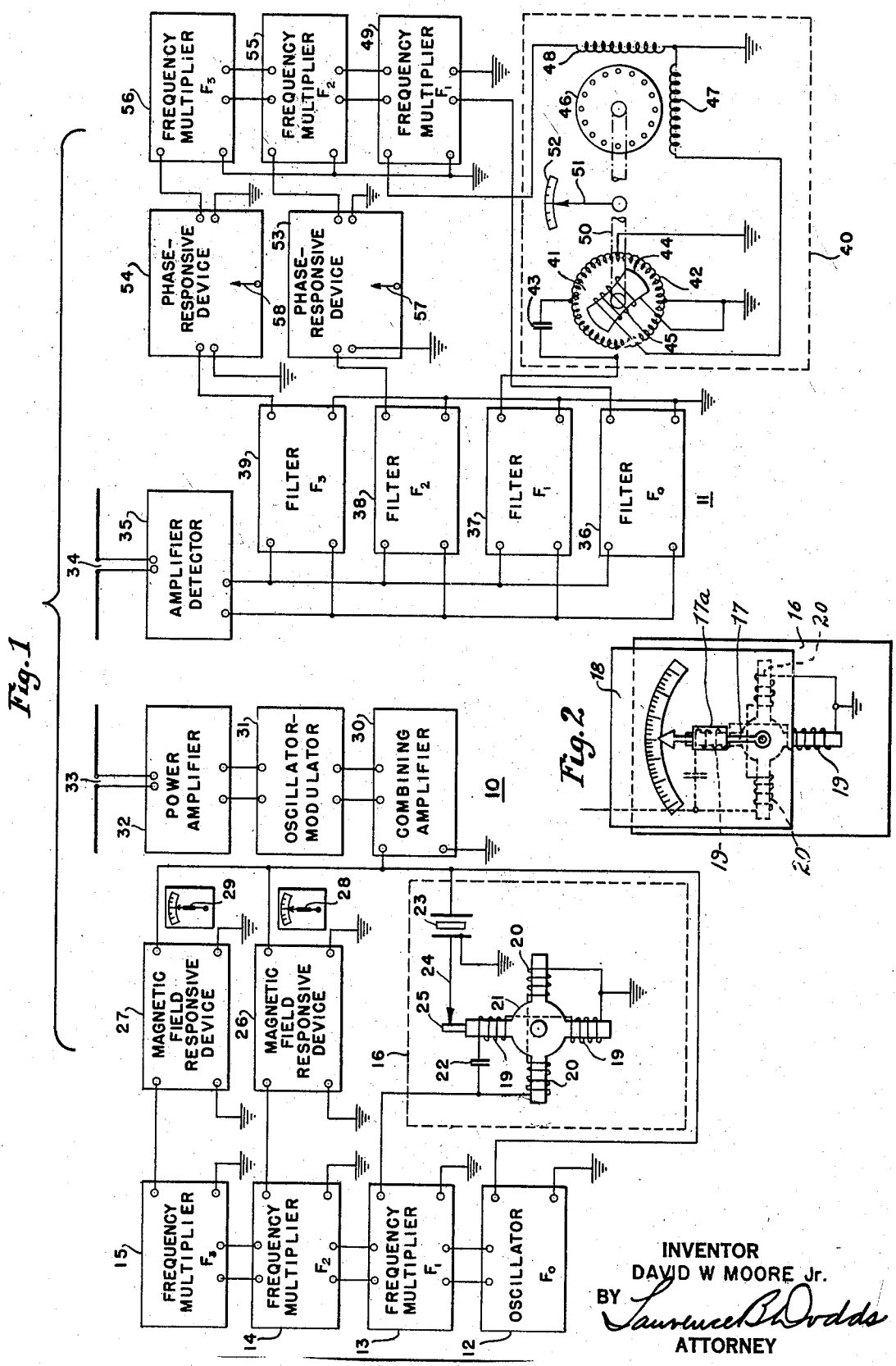
INVENTOR
DAVID W MOORE Jr.
BY Laurence B. Dodds
ATTORNEY Patented July 2, 1946

2,402,973

UNITED STATES PATENT OFFICE 2,402,973

TRANSMITTER FOR TELEMETERING SYSTEMS

David W. Moore, Jr., New York, N. Y., assignor to Fairchild Camera and Instrument Corporation, a corporation of Delaware Application May 18, 1942, Serial No. 443,412

13 Claims. (Cl. 177—380)

This invention relates to telemetering systems and magnetic field responsive devices useful therein and, while it is of general application, it is particularly useful for giving remote indications of the readings of a plurality of aircraft instruments with the least possible modification of the instruments, per se.

While a wide variety of telemetering systems have heretofore been proposed for giving remote indications of the readings of meters, gauges, and other instruments, in general these have required special construction of the meters or instruments or extensive modifications of existing devices to adapt them for use in the telemetering system. On the other hand, it is highly desirable to provide a telemetering system adapted to operate from standard meters and instruments with a minimum of modification. This is particularly true in the case of aircraft instruments, a very large number of which are generally included in an aircraft and in which the space and weight restrictions seriously limit the extent of permissible modification.

It is an object of the present invention, therefore, to provide a new and improved telemetering system for giving a remote indication of the readings of meters, gauges, and other instruments which involves a minimum modification of the instruments and is simple and reliable in construction and operation.

It is another object of the invention to provide a new and improved magnetic field responsive device which, while of general application, is particularly suitable for use as a component element of the telemetering system of the invention. When so used, the only modification of the meters, gauges, or other instruments is the attachment of a small permanent bar magnet to the indicating or metering element of the instrument.

In accordance with the invention, a sending station in a telemetering system comprises a primary metering element, a base-frequency oscillator, a frequency multiplier excited from said oscillator, means for deriving from said multiplier a multiple-frequency wave varying in phase in accordance with the indication of the metering element, and means for transmitting a periodic wave of a phase varying with said derived periodic wave and a periodic wave of a phase determined by the excitation of said oscillator.

Also, in accordance with the invention, a sending station in a telemetering system comprises a primary metering element, a periodic wave supply circuit, means for producing a magnetic field, and means for varying the direction of the magnetic field in accordance with the indication of the primary metering element. The sending station also includes a magnetic field responsive device for deriving from the supply circuit a periodic wave varying in phase in accordance with the direction of the magnetic field, and means for transmitting a periodic wave of a phase varying with the derived periodic wave.

Also in accordance with a feature of the invention, the magnetic field responsive device comprises polyphase coil means, a pivoted supporting member for the coil means, and a polyphase periodic wave supply circuit for exciting the coil means to produce a rotating field. The supporting member is balanced in the absence of an external magnetic field but is subject to vibration in the presence of an external magnetic field having a component normal to the pivotal axis of the coil means and the phase of vibration of the supporting member varies in accordance with the direction of the magnetic field. The device also includes means responsive to the vibration of the supporting member for giving an indication of the direction of such component of the external magnetic field.

For a better understanding of the present invention, together with other and further objects thereof, reference is had to the following description taken in connection with the accompanying drawing, and its scope will be pointed out in the appended claims.

Referring to the drawing, Fig. 1 is a circuit diagram, partly schematic, of a complete telemetering system embodying the invention and utilizing a magnetic field responsive device and a phase-indicating device representing subsidiary features of the invention; while Fig. 2 is a detailed view showing one relationship of the field-responsive device of Fig. 1 to the meter being telemetered.

Referring now to Figs. 1 and 2 of the drawing, there is represented a telemetering system including a sending station 10 and a receiving station 11, the sending station 10 including a periodic wave supply circuit, such as the oscillator 12, generating a base frequency F₀. Coupled to the oscillator 12 are a plurality of frequency multipliers 13, 14 and 15 the output circuits of which comprise a plurality of periodic wave supply circuits of different but harmonically related frequencies, each corresponding to one of the metering elements to be telemetered, and adapted to develop from the supply circuit consisting of the output circuit of oscillator 12 periodic waves of harmonically related frequencies $F_1$, $F_2$, and $F_3$, respectively. Connected to the output circuit of the frequency multiplier 13 is a magnetic field responsice device 16 which, while it is of general application, is particularly suitable for use in the telemetering system of the invention for deriving from the periodic wave supply circuit comprising such output circuit a periodic wave varying in phase in accordance with indications of a primary metering element 17 of a meter or instrument 18, specifically in accordance with variations in the direction of a magnetic field controlled by the primary metering element. The meter 18 must of course be in close association with the field-responsive device 16, one satisfactory relationship being shown in Fig. 2 in which the meter is immediately in front of the device 16, corresponding elements of Figs. 1 and 2 being identified by the same reference numerals. The field responsive device 16 comprises a polyphase coil means, such as the two phase windings 19, 19 and 20, 20 disposed on a supporting member, such as the cruciform magnetic armature or spider 21, of laminated or suitably divided magnetic material. As indicated, the armature is pivoted or otherwise oscillatably mounted. In order to excite the two phase windings 19, 19 and 20, 20 from the frequency multiplier 13, the windings 19, 19 are connected to the output circuit of this frequency multiplier through a phase-shifting condenser 22 which co-operates with the output circuit of the frequency multiplier 13 to provide a polyphase periodic wave supply circuit for exciting the coil means to produce a rotating field.

The supporting member or armature 21 is normally balanced about its pivotal axis in the absence of an external magnetic field, but is subject to vibration in the presence of an external magnetic field having a component in a plane normal to the pivotal axis of the coil means and its supporting armature 21. There is therefore provided means for producing a magnetic field and means for varying the direction of such field in accordance with the indication of the primary metering element. These means may take the form of an angularly movable permanent magnet actuated by the metering element, for example, a small permanent bar magnet 17a attached to the primary metering element 17 pivoted or oscillatably mounted about an axis parallel to that of the armature 21. This vibration of armature 21 about its pivot is due to the magnetic couple between the rotating field of the coil means 19, 19 and 20, 20 and the component of the magnetic field of magnet 17a in a plane normal to the pivotal axis of the coil means. The magnetic field responsive device 16 also includes means responsive to the vibration of the coil means and its supporting armature 21 for giving an indication of the direction of the component of the magnetic field. This means comprises a piezoelectric crystal 23 connected by a link 24 to an extension 25 of one of the arms of the armature 21 for vibration thereby, the crystal 23 acting as a resilient restraining means for limiting the amplitude of vibration of the supporting armature. Preferably the armature 21 and its coil means 19, 19 and 20, 20 and the resilient restraining means 23 have a natural frequency of mechanical vibration substantially the same as that of the polyphase periodic wave supply circuit comprising the output circuit of frequency multiplier 13 and condenser 22.

The crystal 23 constitutes means for developing from the mechanical vibrations of the armature 21 electrical oscillations varying in phase in accordance with the direction of the component of the magnetic field of magnet 17a in a plane normal to the pivotal axis of armature 21, as explained hereinafter. The rest of the telemetering system comprises means for utilizing the electrical oscillations generated by the crystal 23 for giving an indication of the direction of such component of the magnetic field.

Connected to the output circuits of the frequency multipliers 14 and 15 are magnetic field responsive devices 26 and 27, respectively, indicated schematically since they may be in all respects similar to the device 16. Each of the elements 16, 26, and 27 comprises means for deriving from its associated periodic wave supply circuit a periodic wave varying in phase in accordance with indications of its associated primary metering elements 17, 28, and 29, respectively. The output periodic waves of the units 12, ( ), 26, and 27 are applied to means for transmitting these periodic waves comprising a combining amplifier 30, the output of which is impressed upon an oscillator-modulator 31 coupled, in turn, to a power amplifier 32, the output circuit of which is coupled to a radiating antenna 33, these elements comprising means for transmitting the waves derived from the field responsive devices 16, 26, and 27 and a periodic wave derived from the supply circuit comprising the output circuit of oscillator 12. In the example described, each of these waves, as transmitted, is of the same phase and frequency as the excitation of its respective supply circuit but, of course, it will be understood that each wave may be stepped up or down in frequency for transmission, provided only that the transmitted wave is of a phase determined by or varying with the excitation of its respective source or supply circuit.

The receiving station 11 comprises means for receiving the transmitted periodic waves comprising a receiving antenna 34, an amplifier and detector 35, and a plurality of filters 36, 37, 38, and 39 adapted to receive the detected periodic waves of frequencies $F_0$, $F_1$, $F_2$, and $F_3$, respectively. Coupled to the output circut of the filter 37 to be energized by a received wave of frequency $F_1$ is a phase-responsive device 40. The phase-responsive device 40 includes a phase-shifting means, such as a phase-shifting transformer 41 having a stationary polyphase distributed winding 42 energized from the received wave output of filter 37 through a phase-splitting condenser 43 and a movable element or armature 44 having a winding 45 disposed thereon. The phase-responsive device 40 also includes a polyphase phase-responsive means, such as the two-phase induction motor 46 having a first phase winding 47 excited from the movable winding of the phase-shifting transformer 41 and a second phase winding 48 excited from another received wave of the same frequency as the output of the filter 37. This other received wave is derived from a frequency multiplier 49 which develops a frequency $F_1$ from the periodic wave of base frequency $F_0$ selected by the filter 39. The phase-responsive device 40 thus comprises means responsive to the phase relation between the excitation of the supply circuit constituting the output circuit of frequency multiplier 13 and the oscillations derived by field responsive device 16. The motor 46 is connected to actuate the movable winding 45 of the phase-shifting transformer 41 by means of the shaft 50 to adjust the movable winding 45 until the motor is balanced. Also attached to the shaft 50 of the phase-responsive motor 46 for actuation thereby is a secondary metering element 51 cooperating with a scale 52 for reproducing the indication of the corresponding primary metering element 17. The phase-responsive and phase-indicating device 40, per se, forms the subject matter of my copending divisional application, Serial No. 477,757, filed March 2, 1943.

The receiving station 11 includes a plurality of other phase-responsive units 53 and 54 energized from the variable phase periodic waves selected by the filters 38 and 39, respectively, and from periodic waves derived from the constant phase received wave selected by filter 36 through frequency multipliers 55 and 56, respectively, for developing periodic waves of frequencies $F_2$ and $F_3$, respectively. The frequency multipliers 49, 55 and 56 thus comprise means for deriving from the received wave of the same frequency and phase as the output of oscillator 12 a plurality of secondary waves of the same harmonically related frequencies $F_1$, $F_2$, and $F_3$ as those derived by the frequency multipliers 13, 14 and 15 at the sending station 10.

In considering the operation of the above-described telemetering system, it will be assumed that the oscillator 12 at the sending station 10 is generating a base frequency $F_0$ which is utilized to excite the frequency multipliers 13, 14, and 15 for developing high-frequency periodic waves, the frequencies $F_0$, $F_1$, $F_2$, and $F_3$ all being harmonically related. The periodic wave of frequency $F_1$ is applied through the phase-splitting condenser 22 to the polyphase coil means 19, 19 and 20, 20 of the magnetic field responsive device 16 which excites its pivoted magnetic armature 21 with a rotating magnetic field. In the absence of an external field, the armature 21 is balanced about its pivotal axis. However, in the presence of a magnetic field having a component in a plane normal to the pivotal axis of the armature 21 and its associated coil means, the magnetic couple between the rotating field of the armature 21 and the external field reverses the polarity during each cycle of rotation of the magnetic field, causing a vibration of the armature 21 and associated coil means at the frequency of excitation. This mechanical vibration is transmitted to, but restrained in amplitude by, the piezoelectric crystal 23 which generates electrical oscillations of the same frequency and phase as the mechanical vibrations of armature 21. In this case the external magnetic field is that developed by the permanent magnet 17a attached to the primary metering element 17. The phase of the mechanical vibrations relative to the phase of the periodic wave supplied by frequency multiplier 13, and thus the phase of the electrical oscillations developed by crystal 23, varies directly in accordance with the direction of the magnetic field of the magnet 17a and thus directly with the angular position of the primary metering element 17.

In a similar fashion, the magnetic field responsive devices 26 and 27 derive periodic waves of frequencies $F_2$ and $F_3$ from the periodic wave outputs of the frequency multipliers 14 and 15, respectively, the derived periodic waves varying in phase in accordance with the angular positions of the primary metering elements 28 and 29, respectively. The output oscillations of the units 16, 26, and 27 can be utilized directly for giving indications of the directions of the magnetic fields corresponding thereto. In the present telemetering system, they are combined with the output of the oscillator 12 in the combining amplifier 30, impressed on a carrier wave in the oscillator-modulator 31, amplified in a power amplifier 32, and radiated by the antenna 33 for transmission.

At the receiving station 11, the transmitted carrier wave is picked up by the antenna 34, amplified and detected in the unit 35, and the modulation components of frequencies $F_0$, $F_1$, $F_2$, and $F_3$ selected by the filters 36, 37, 38, and 39, respectively. It will be appreciated, however, that, if desired, the periodic waves of frequencies $F_0$, $F_1$, $F_2$, and $F_3$ may be transmitted by wire directly from the sending station 10 to the receiving station 11 without the use of a radio link.

The variable phase periodic wave of frequency $F_1$ selected by filter 37 is applied through the phase-splitting condenser 43 to the stationary armature of the phase-shifting transformer 41, the output of which is taken from the movable winding 45 and has a phase dependent upon the position of the movable element. The output of the winding 45 is applied to excite a first phase winding 47 of the two-phase phase-responsive induction motor 46, the second phase winding 48 of which is excited with a periodic wave, also of frequency $F_1$, derived by the frequency multiplier 49 which, in turn, is excited with the received constant phase periodic wave of frequency $F_0$ selected by filter 36.

It is evident that the phase of the periodic wave of frequency $F_1$ selected by filter 37 corresponds in phase with that developed by the magnetic field responsive device 16 at the sending station and thus varies in accordance with the angular position of the primary metering element 17. It is also evident that the periodic wave of frequency $F_1$ derived from the frequency multiplier 49 through the filter 36 is of a constant phase, being derived directly from the base-frequency oscillator 12. Therefore, the relative phases of these two periodic waves is an indication of the angular position of the primary metering element 17. While the relative phases of these two waves may be measured by any suitable phase-responsive means, a preferred form is that comprising the phase-shifting transformer 41 and two-phase induction motor 46.

Assuming an initial deflection of the primary metering element 17 and a zero reading of the secondary metering element 51, the output of the phase-shifting transformer 41 is not in phase with that derived from the frequency multiplier 49, the two phase windings 47 and 48 are excited out of phase, and the motor 46 operates to adjust the movable winding 45 to such a position that these two periodic waves have the same phase, when the motor 46 is rebalanced. At the same time, the secondary metering element 51 is actuated by the shaft 50 of the motor 46 and is moved through an angle equal to the angle of deflection of the primary metering element 17.

In a similar manner the phase-responsive devices 53 and 54 and their associated filters 38 and 39, respectively, and frequency multipliers 55 and 56, respectively, operate to adjust the secondary metering elements 57 and 58, respectively, to correspond to the positions of the primary metering elements 28, and 29, respectively. While there has been illustrated, by way of example, a system employing three primary metering elements and a like number of secondary metering elements, it will be understood that any desired number of metering elements may be included in the sending and receiving stations. It will also be understood that, instead of continuously transmitting periodic waves of different frequencies corresponding to the indications of the several primary metering elements, these indications may be transmitted successively on a single wave of a single frequency by providing synchronously controlled selectors at the sending and receiving stations.

The telemetering system described has a number of advantages. It requires no modification of the primary meters or instruments other than the attachment of a small permanent bar magnet to the metering element of each; it provides continuous and direct readings; it is substantially insensitive to variations in the supply voltage or frequency; and it requires a minimum frequency band for transmission since the variations in phase of the waves of frequencies $F_1$, $F_2$, and $F_3$ are sufficiently slow that each wave is essentially a single constant frequency.

The field responsive devices 16, 26, 27 also have a number of advantages, per se; they are direct reading and do not need to be re-oriented or re-adjusted to the null point for each reading; when amplitude as well as phase of the output of the device is compared with that of the supply circuit, the device also gives an indication of the density of the component of the external magnetic field in a plane normal to the pivotal axis of the device.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a telemetering system, a sending station comprising a primary metering element, a periodic wave supply circuit, means for producing a magnetic field, means for varying the direction of said field in accordance with the indication of said element, a magnetic field-responsive device for deriving from said supply circuit a periodic wave varying in phase in accordance with the direction of said field, and means for transmitting a periodic wave of a phase varying with said derived periodic wave.

2. In a telemetering system, a sending station comprising a primary metering element, a periodic wave supply circuit, an angularly movable permanent magnet actuated by said metering element, a magnetic field-responsive device for deriving from said supply circuit a periodic wave varying in phase in accordance with the direction of the field of said magnet, and means for transmitting a periodic wave of a phase varying with said derived periodic wave.

3. In a telemetering system, a sending station comprising an oscillatable primary metering element, a periodic wave supply circuit, a permanent bar magnet attached to said metering element, a magnetic field-responsive device for deriving from said supply circuit a periodic wave varying in phase in accordance with the direction of the field of said magnet, and means for transmitting a periodic wave of a phase varying with said derived period wave.

4. In a telemetering system, a sending station including a plurality of primary metering elements, a plurality of periodic wave supply circuits of different frequencies each corresponding to one of said metering elements, means for producing a plurality of magnetic fields, means for individually varying the directions of said fields in accordance with the indications of said metering elements, a magnetic field-responsive device associated with each of said circuits for deriving therefrom a periodic wave varying in phase in accordance with the direction of its corresponding magnetic field, and means for transmitting periodic waves of phases individually varying with said derived periodic waves.

5. In a telemetering system, a sending station including a plurality of primary metering elements, a plurality of circuits for developing from said supply circuit a plurality of waves of harmonically related frequencies each corresponding to one of said metering elements, means for producing a plurality of magnetic fields, means for individually varying the directions of said fields in accordance with the indications of said metering elements, a magnetic field-responsive device associated with each of said circuits for deriving therefrom a periodic wave varying in phase in accordance with the direction of its corresponding magnetic field, and means for transmitting periodic waves of phases individually varying with said derived periodic waves.

6. In a telemetering system, a sending station comprising a primary metering element, a polyphase periodic wave supply circuit, means for producing a magnetic field, means for varying the direction of said field in accordance with the indication of said element, a magnetic field-responsive device disposed in said magnetic field and consisting of polyphase coil means excited from said supply circuit, an oscillatable supporting member for said coil means, said supporting member being balanced in the absence of an external magnetic field but subject to vibration in the presence of said magnetic field, the phase of said vibration varying in accordance with the direction of said magnetic field, means responsive to said vibration for developing a periodic wave varying in phase in accordance with the direction of said magnetic field, and means for transmitting a wave varying in phase with said developed periodic wave.

7. In a telemetering system, a sending station comprising a primary metering element, a base-frequency oscillator, a frequency multiplier excited from said oscillator, means for deriving from said multiplier a multiple-frequency wave, means for producing a magnetic field, means for varying the direction of said field in accordance with the indication of said element, a magnetic field-responsive device for deriving from said multiplier a multiple-frequency wave varying in phase in accordance with the direction of said field, and means for transmitting a periodic wave of a phase varying with said derived periodic wave.

8. A magnetic field responsive device comprising, polyphase coil means, an oscillatable supporting member for said coil means, a polyphase periodic wave supply circuit for exciting said coil means to produce a rotating field, said supporting member being balanced in the absence of an external magnetic field but subject to vibration in the presence of an external field having a component in a plane normal to the axis of oscillation of said coil means, the phase of said vibration varying in accordance with the direction of said magnetic field, and means responsive to said vibration for developing an electrical effect representative of the direction of said component of said external field.

9. A magnetic field responsive device comprising, polyphase coil means, an oscillatable magnetic armature for said coil means, a polyphase periodic wave supply circuit for exciting said coil means to produce a rotating field, said armature being balanced in the absence of an external magnetic field but subject to vibration in the presence of an external field having a component in a plane normal to the pivotal axis of said coil means, the phase of said vibration varying in accordance with the direction of said magnetic field, and means responsive to said vibration for developing an electrical effect representative of the direction of said component of said external field.

10. A magnetic field responsive device comprising, polyphase coil means, an oscillatable supporting member for said coil means, a polyphase periodic wave supply circuit for exciting said coil means to produce a rotating field, said supporting member being balanced in the absence of an external magnetic field but subject to vibration in the presence of an external field having a component in a plane normal to the axis of oscillation of said coil means, the phase of said vibration varying in accordance with the direction of said magnetic field, resilient restraining means for limiting the amplitude of vibration of said supporting member, and means responsive to said vibration for developing an electrical effect representative of the direction of said component of said external field.

11. A magnetic field responsive device comprising, polyphase coil means, an oscillatable supporting member for said coil means, a polyphase periodic wave supply circuit for exciting said coil means to produce a rotating field, said supporting member being balanced in the absence of an external magnetic field but subject to vibration in the presence of an external field having a component in a plane normal to the axis of oscillation of said coil means, the phase of said vibration varying in accordance with the direction of said magnetic field, resilient restraining means for limiting the amplitude of vibration of said supporting member, said armature and said resilient means having a natural frequency of mechanical vibration substantially equal to that of said periodic wave circuit, and means responsive to said vibration for developing an electrical effect representative of the direction of said component of said external field.

12. A magnetic field responsive device comprising, polyphase coil means, an oscillatable supporting member for said coil means, a polyphase periodic wave supply circuit for exciting said coil means to produce a rotating field, said supporting member being balanced in the absence of an external magnetic field but subject to vibration in the presence of an external field having a component in a plane normal to the axis of oscillation of said coil means, the phase of said vibration varying in accordance with the direction of said magnetic field, and means for developing from mechanical vibrations of said supporting member oscillations varying in phase in accordance with the direction of said component of said external field.

13. A magnetic field responsive device comprising, polyphase coil means, an oscillatable supporting member for said coil means, a polyphase periodic wave supply circuit for exciting said coil means to produce a rotating field, said supporting member being balanced in the absence of an external magnetic field but subject to vibration in the presence of an external field having a component in a plane normal to the axis of oscillation of said coil means, the phase of said vibration varying in accordance with the direction of said magnetic field, a piezoelectric device connected to said supporting member for vibration thereby and including means for developing an electrical effect representative of the direction of said component of said external field.

DAVID W. MOORE, JR.